(12) United States Patent
Grassin et al.

(10) Patent No.: US 12,385,883 B2
(45) Date of Patent: Aug. 12, 2025

(54) MANUAL NON-DESTRUCTIVE TESTING SYSTEM AND METHOD

(71) Applicant: COMMISSARIAT A L'ENERGIE ATOMIQUE ET AUX ENERGIES ALTERNATIVES, Paris (FR)

(72) Inventors: Florence Grassin, Auffargis (FR); Vincent Saint-Martin, Sartrouville (FR); Michel Cardoso, Boulogne-Billancourt (FR); Thomas Desrez, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 28 days.

(21) Appl. No.: 17/787,220

(22) PCT Filed: Dec. 16, 2020

(86) PCT No.: PCT/FR2020/052472
§ 371 (c)(1),
(2) Date: Jun. 17, 2022

(87) PCT Pub. No.: WO2021/123623
PCT Pub. Date: Jun. 24, 2021

(65) Prior Publication Data
US 2023/0019600 A1    Jan. 19, 2023

(30) Foreign Application Priority Data
Dec. 19, 2019   (FR) ........................... 1914913

(51) Int. Cl.
*G01N 29/265*    (2006.01)
*G01N 29/24*     (2006.01)

(52) U.S. Cl.
CPC ....... *G01N 29/265* (2013.01); *G01N 29/2406* (2013.01)

(58) Field of Classification Search
CPC .. G01N 29/265; G01N 29/2406; G01N 29/11; G01N 2291/044; G01N 2291/106; G01N 29/226; G01N 29/262; G01N 29/30; G01N 29/043
See application file for complete search history.

(56) References Cited

U.S. PATENT DOCUMENTS

2004/0016299 A1* 1/2004 Glascock ............. G01N 29/262
                                                        73/644
2005/0005700 A1* 1/2005 Abbasi ................. G01N 29/223
                                                        73/620

(Continued)

FOREIGN PATENT DOCUMENTS

EP    2 846 158 A2    3/2015
ES    2 411 811 A2    7/2013

(Continued)

OTHER PUBLICATIONS

International Search Report issued Apr. 23, 2021 in PCT/FR2020/052472 filed Dec. 16, 2020, 2 pages.

(Continued)

*Primary Examiner* — Akm Zakaria
(74) *Attorney, Agent, or Firm* — Oblon, McClelland, Maier & Neustadt, L.L.P.

(57) ABSTRACT

A manual system for non-destructive testing of a part to be tested includes a sub-system for acquiring non-destructive test data comprising a probe, a sub-system for tracking the position of the probe, and a sub-system for acquiring surface characterisation data of a test zone defined on the surface of the part. The system also includes a central sub-system for controlling the test data acquisition, surface characterisation data acquisition and position tracking subsystems as a function of the test zone covered by the probe manipulated (Continued)

by an operator, the central subsystem being able to synchronise the operation of the test data acquisition, surface characterisation data acquisition and position tracking subsystems and to pair the data produced by the test data acquisition, surface characterisation data acquisition and position tracking subsystems during their operation.

14 Claims, 6 Drawing Sheets

(56) References Cited

U.S. PATENT DOCUMENTS

| | | | |
|---|---|---|---|
| 2015/0039245 A1* | 2/2015 | Langlois | G01N 29/043 702/39 |
| 2018/0202798 A1* | 7/2018 | Hernández Serrano | G01N 29/225 |
| 2020/0393524 A1* | 12/2020 | DeBiccari | G01R 33/1223 |
| 2022/0313216 A1* | 10/2022 | Werner | G06F 3/0484 |
| 2022/0341885 A1* | 10/2022 | Badeau | G01N 29/07 |

FOREIGN PATENT DOCUMENTS

| | | |
|---|---|---|
| FR | 2 930 642 A1 | 10/2009 |
| FR | 3 045 165 A1 | 6/2017 |
| FR | 3 087 254 A1 | 10/2018 |

OTHER PUBLICATIONS

French Preliminary Search Report issued Jul. 9, 2020 in French Patent Application No. 1914913, 1 page.

* cited by examiner

MANUAL NON-DESTRUCTIVE TESTING SYSTEM AND METHOD

TECHNICAL FIELD

The present invention relates in general terms to the non-destructive testing of mechanical parts. It relates more particularly to a mechanical testing according to which an operator implements a manual acquisition of measurements on a mechanical part to be tested.

PRIOR ART

FR 3 045 165 describes a method that produces adaptive imaging taking into account the surface under the sensor. A first optimised image for water is produced without prior knowledge of the material under the sensor. Only the size and the position of the image under the sensor are parameterised. From this image in water, a profile of the surface is extracted. By means of this profile (i.e. the surface), new parameters are calculated for producing an image in the material. The new parameters are calculated with a static configuration and for the surface under the sensor. There is no taking into account of the positioning of the sensor with respect to the material in order to change the configuration of the adjustments.

FR 2 930 642 relates to the production of a sensor with flexible contact that adapts to the surface of the object to be tested. A mat of piezoelectric elements deforms with respect to the surface. A profile is calculated from this deformation. From this profile and from the ultrasound adjustment required, adapted delay laws are calculated and applied by the acquisition system. Technically, the delay laws are adapted to the deformation of the mat of elements. This requires a specific sensor and a computer, but there are no takings into account of the positioning of the sensor with respect to the surface.

FR 1 859 569 relates to defining and configuring a work scene in the space for an operator implementing a manual acquisition of measurements on a mechanical part to be tested. Two tools located by a movement-monitoring system are necessary: a tip and a rigid body connected to the sensor. This technique makes it possible to position the surface of the sensor in the reference frame related to the work surface.

EP 2 846 158 proposes a manual acquisition approach via a real-time feedback to the test operator to respect a planned pathway and associated adjustments.

This method requires:
A precise 3D CAD model of the surface of the part.
Planning of all the acquisition positions with their associated adjustments.
Construction of a hologram representing the pathway to be followed by the operator.
Precise positioning of this hologram in augmented reality on the surface to be inspected.
Assistance and guidance of the operator for respecting the pathway.
Changing to a mode of characterising the defect is not compatible with monitoring the pathway.

DISCLOSURE OF THE INVENTION

The invention aims to solve the problems of the prior art by providing a manual system for non-destructive testing of a part to be tested, including
A sub-system for acquiring non-destructive test data including a probe,
A sub-system for monitoring the position of the probe,
A sub-system for acquiring data characterising the surface of a test zone defined on the surface of the part to be tested,
characterised in that the sub-system for acquiring surface-characterisation data is able to receive as an input a set of acquired data of the surface of the part inspected by the test probe,
and in that the system includes
a central sub-system for controlling the sub-systems for acquiring test data and for acquiring surface-characterisation and position-monitoring data, according to the test zone travelled over by the probe manipulated by an operator and a predefined operating mode, the central sub-system being able to synchronise the operation of the sub-systems for acquiring test data and for acquiring surface-characterisation and position-monitoring data, and to pair the data produced by the sub-systems for acquiring test data and for acquiring surface-characterisation and position-monitoring data during operation thereof.

The present invention allows manual non-destructive testing on a complex surface of a part without requiring prior pathway planning and associated adjustments.

The invention guarantees the correct synchronisation and pairing of the data coming from the various sub-systems (test signals and positioning of the sensor). Furthermore, the invention allows real-time feedback of the information to the operator. The invention makes manual non-destructive testing of the part more reliable.

The invention also makes it possible to take into account in real time the exact surface of the part.

The invention provides expertise to the operator to guarantee compliance with the procedure.

The invention makes it possible to change acquisition mode according to the context (part, sensor, operator, etc.):
Zone-coverage and potential-defects-detection mode.
Defect-characterisation mode.

The invention makes it possible to record in the report all or some of the relevant information for the testing (sizing and position of defects, useful signals, etc.), according to the procedure and the storage capacity.

According to a preferred feature, the central control sub-system is able to simultaneously send a trigger instruction to the position monitoring sub-system and a trigger instruction to the sub-system for acquiring surface-characterisation data, for the surface characterisation.

According to a preferred feature, the central control sub-system is able to pair the position data of the probe and the data for characterising the surface of the test zone that are received in response to the sending of the trigger instruction simultaneously sent to the position-monitoring sub-system and to the sub-system for acquiring surface-characterisation data.

According to a preferred feature, the central control sub-system is able to simultaneously send a trigger instruction to the position-monitoring sub-system and a trigger instruction to the test-data acquisition sub-system, for acquiring test data.

According to a preferred feature, the central control sub-system is able to pair the position data of the probe and the test data that are received in response to the sending of the simultaneous trigger instruction sent to the position-monitoring sub-system and to the test-data acquisition sub-system.

According to a preferred feature, the test-data acquisition sub-system is an ultrasound system including an ultrasound probe.

According to a preferred feature, the probe-position monitoring sub-system is an optical system.

According to a preferred feature, the sub-system for acquiring surface-characterisation data is able to produce a set of parameters characteristic of this surface in the form of a surface meshing.

The invention also relates to a method for the non-destructive testing of a part to be tested with the non-destructive testing system as previously presented, characterised in that it includes steps of detecting a potential defect and, when a defect is detected, of characterising the detected defect, the steps of detecting a potential defect and of characterising the detected defect including:

simultaneous sending, by the central control sub-system, of an instruction to trigger the position monitoring to the probe-position monitoring sub-system and an instruction to trigger the acquisition of surface-characterisation data to the sub-system for acquiring surface-characterisation data, and simultaneous sending by the central control sub-system of an instruction to trigger the position monitoring to the sub-system for monitoring the position of the probe and an instruction to trigger the acquisition of test data to the test-data acquisition sub-system.

According to a preferred feature, the potential-defect detection step includes the acquisition of data for characterising the surface of the test zone by the sub-system for acquiring surface-characterisation data and the use of the data characterising the surface of the test zone for determining the position of the defect.

According to a preferred feature, the step of characterising the detected defect includes the use of data characterising the surface of the test zone to determine a sequence for adjusting acquisition of non-destructive test data around the position of the detected defect.

The method has advantages similar to those previously presented.

In a particular embodiment, the steps of the method according to the invention are implemented by computer program instructions.

Consequently the invention also relates to a computer program on an information carrier, this program being able to be implemented in a computer, this program containing instructions adapted for implementing steps of a method as described above.

This program can use any programming language, and be in the form of a source code, object code, or code intermediate between source code and object code, such as in a partially compiled form, or in any other desirable form.

The invention also relates to an information carrier that can be read by a computer, and including computer program instructions adapted for implementing the steps of a method as described above.

The information carrier may be any entity or device capable of storing the program. For example, the carrier may include a storage means, such as a ROM, for example a CD ROM or a microelectronic-circuit ROM, or a magnetic recording means, for example a diskette or a hard disk.

Moreover, the information carrier may be a transmissible carrier such as an electrical or optical signal, which can be conveyed via an electrical or optical cable, by radio or by other means. The program according to the invention may in particular be downloaded on a network of the internet type.

Alternatively, the information carrier may be an integrated circuit in which the program is incorporated, the circuit being adapted for executing or for being used in the execution of the method according to the invention.

BRIEF DESCRIPTION OF THE DRAWINGS

Other features and advantages will emerge from the reading of the following description of a preferred embodiment, given by way of non-limitative example, described with reference to the figures, wherein.

Identical, similar or equivalent parts of the various figures bear the same numerical references so as to facilitate passing from one figure to another.

The various possibilities (variants and embodiments) must be understood as not being exclusive of each other and may be combined with each other.

DETAILED DESCRIPTION OF PARTICULAR EMBODIMENTS

Figure 1:
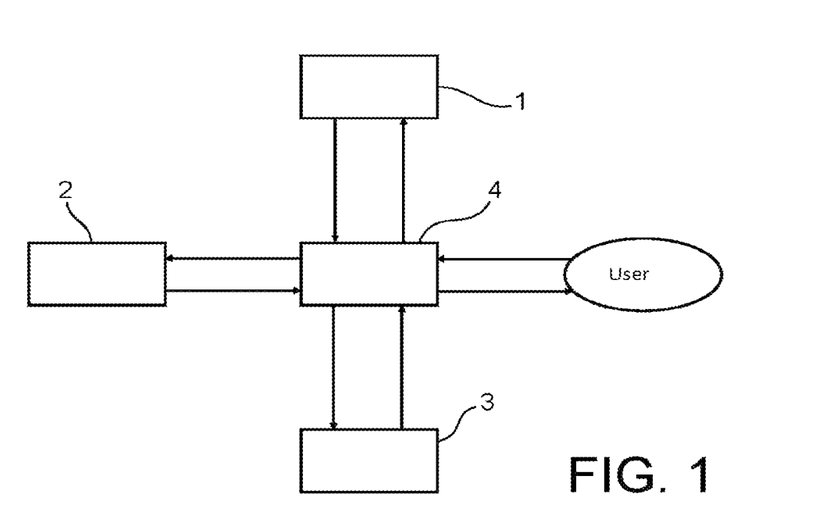
FIG. 1 illustrates a system for non-destructive testing of a part according to an embodiment of the invention.

According to a preferred embodiment, shown in FIG. 1, the non-destructive testing system is intended for the manual non-destructive testing for example of a mechanical part P, such as an assembly of butt-welded sheets.

Figure 2:
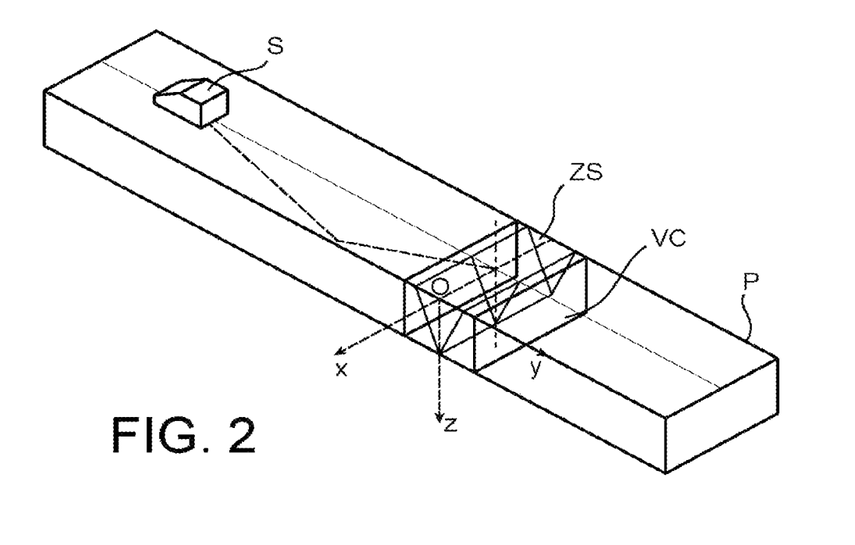
FIG. 2 illustrates a perspective view of a part to be tested by the system of FIG. 1.
Figure 3:
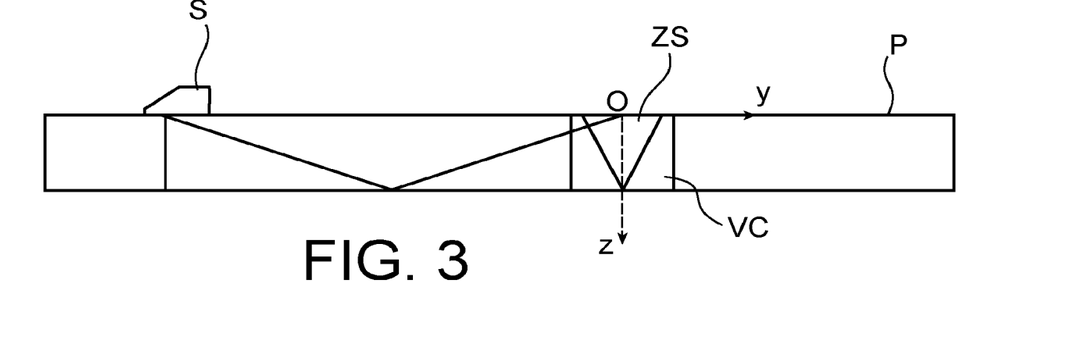
FIG. 3 illustrates a side view of the part to be tested by the system of FIG. 1.
Figure 4:
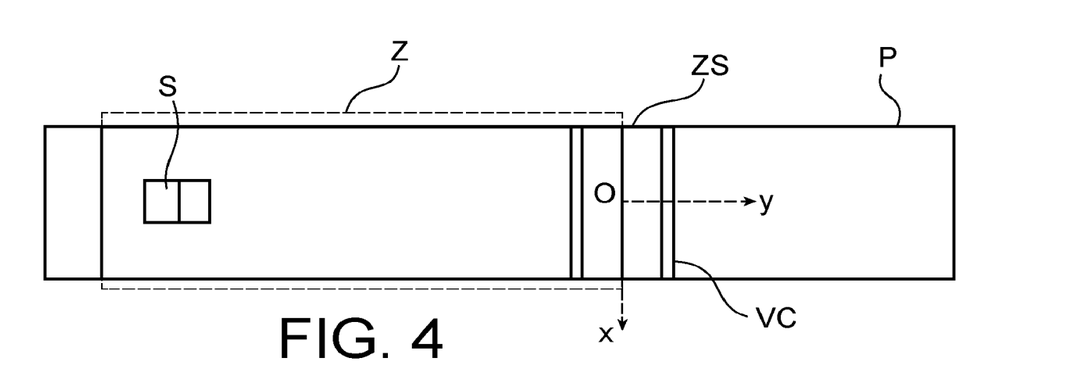
FIG. 4 illustrates a plan view of the part to be tested by the system of FIG. 1.

FIGS. 2, 3 and 4 show perspective, side and plan views respectively of the part to be tested P. The part to be tested P includes a weld zone ZS included in a volume to be tested VC. A test zone Z is defined on the surface of the part to be tested P. An orthonormal reference frame (O, x, y, z) is associated with the test zone. The orthonormal reference frame includes an origin point O located on the surface of the part to be tested and three orthogonal axes.

The system for non-destructive testing of a part includes a sub-system 1 for acquiring non-destructive test data on the part to be tested P. The sub-system 1 for acquiring non-destructive test data can be triggered on external command and makes an acquisition of data in real time. In the preferred embodiment, it is an ultrasound system. The sub-system 1 therefore includes an ultrasound probe S. The ultrasound probe S is for example of the type with multiple elements on flexible shoe, as described in FR 2 930 642. The ultrasound probe S makes it possible to focus the ultrasound beam in various positions by modifying the delay laws of the various emissive and/or receptive elements.

The ultrasound probe S includes a plurality of ultrasound transducers disposed in an array. The transducers are designed to emit ultrasound waves and to detect echoes of the ultrasound waves reflecting on and in the part P.

The transducers are thus disposed on an emitting and receiving surface, referred to as the active surface. The active surface is a rectangle with a planar surface. The probe S is secured to a first rigid body as described in FR 1 859 569.

In a variant, the sub-system 1 uses another technology, for example eddy currents or an X-ray imaging technology, or thermography or multi-spectral technology.

The system for non-destructive testing of a part also includes a sub-system 2 for monitoring the position of the active surface of the non-destructive testing probe S.

The sub-system 2 for monitoring the position of the active surface of the non-destructive testing probe S can be triggered on external command and determines the position of the active surface of the probe S in real time.

In general terms, the sub-system for monitoring the position of a given object determines two types of information simultaneously:
  the position strictly speaking of the object, in the form of three coordinates x, y and z in a given reference frame,
  the orientation of the object, in the form of three angles around axes of the given reference frame.

The position-monitoring sub-system delivers all this information (six degrees of freedom in all). Hereinafter, position is spoken for designating either the position strictly speaking, or the orientation, or the combination of the two.

In the preferred embodiment, it is a case of an optical system as described in FR 1 859 569. The sub-system 2 determines the position and the orientation of the active surface of the probe S in the reference frame of the test zone Z. The position-monitoring sub-system 2 includes an optical movement-monitoring system and a pointing device itself secured to a second rigid body.

In a variant, the sub-system 2 uses another technology, for example infrared, magnetic, ultrasound, mechanical or optical fibre.

The system for non-destructing testing of a part also includes a sub-system 3 for acquiring surface-characterisation data, the purpose of which is to produce a set of data for describing a surface. In the preferred embodiment, the surface characterisation is discrete, it is a question more particularly of a meshing. The surface characterisation may also be continuous and defined by one or more mathematical functions such as parametric curves.

The sub-system for acquiring surface-characterisation data 3 can be triggered on external command and makes an acquisition of data in real time. In the preferred embodiment, it is a case of an ultrasound system that uses the ultrasound probe S.

The sub-system for acquiring surface-characterisation data 3 includes a surface-characterisation computer for determining the characteristics of the surface of the part to be tested from the data acquired by the probe S.

The surface-characterisation computer of the sub-system for acquiring surface-characterisation data 3 implements processing operations that are for example those described in FR 3 045 165.

The computer receives as an input a set of acquired data of the surface of the part inspected by the test probe. These data are processed to obtain a set of parameters characteristic of this surface. These parameters define a set of discrete or continuous functions in three dimensions. This set of functions defines the geometry of the surface of the part being inspected by the test probe, in relation to the reference frame attached to the test probe. The computer produces, for all points on the surface being inspected, its position in the reference frame of the active surface of the probe. In a preferred embodiment, the computer takes the ultrasound signals as an input and produces a three-dimensional meshing of the surface of the part under the active surface of the probe and in relation to the reference frame of the active surface of the probe.

In a variant, the sub-system 3 uses another technology, for example laser or mechanical.

The system for non-destructive testing of a part also includes a central sub-system 4 for control of the sub-system 1 for acquiring non-destructive test data on of the part to be tested, of the position monitoring sub-system 2 and of the sub-system 3 for acquiring surface-characterisation data.

The central control sub-system 4 is a calculator connected to the other sub-systems by cable or non-cable method.

The calculator is for example a computer or an electronic card. It includes in particular a processor executing a computer program implementing the method that will be described and a memory for storing the results thereof. It also includes input and output interfaces and can be associated with a display screen.

Figure 5:
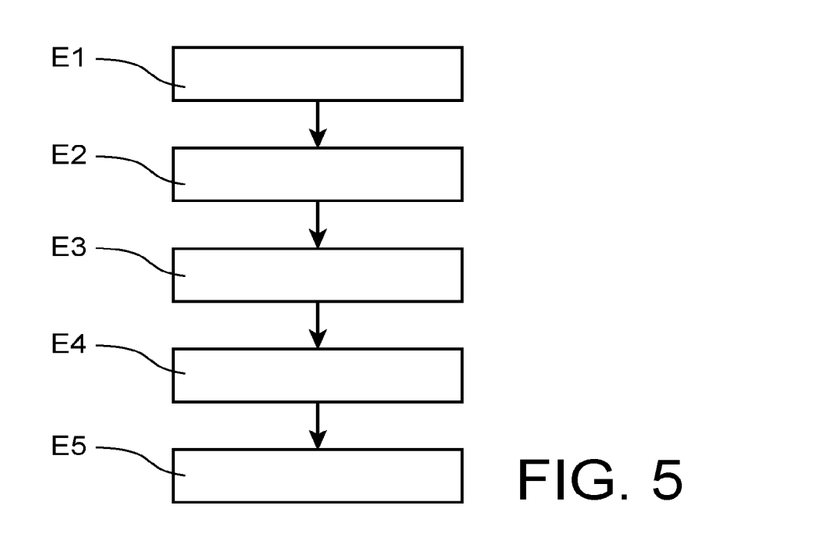
FIG. 5 illustrates a method for the non-destructive testing of a part according to an embodiment of the invention.

FIG. 5 shows a method for the non-destructive testing of a part in the form of a flow diagram including main steps E1 to E5. The method is implemented in the previously described system and shows its operation. The method includes the following main steps:
  preparing the non-destructive testing of the part to be tested,
  calibrating non-destructive testing of the part to be tested,
  detecting potential defects in the test volume of the part to be tested and, when a defect is detected,
  characterising the defect detected, and
  generating a test report.

It is assumed that the system described has been disposed so as to be able to test the mechanical part.

The main step E1 is the preparation of the non-destructive testing of the part to be tested.

Figure 6:
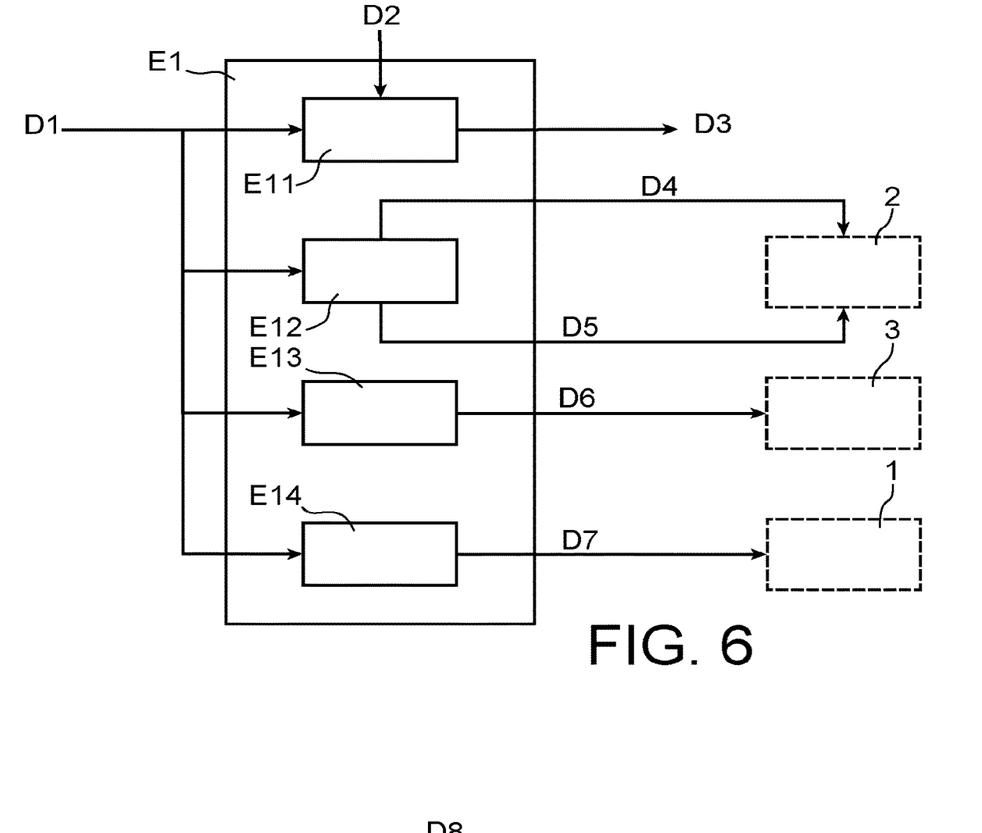
FIG. 6 illustrates steps for preparing the non-destructive testing of the part to be tested, included in the method of FIG. 5.

The main step E1 includes four non-sequential steps E11 to E14 and is detailed in FIG. 6.

Step E11 produces data D3 defining the test zone Z on the part to be tested. The input data of this step are a test procedure D1 and information D2 for defining the part P.

The test procedure D1 contains the whole of the modus operandi that the operator must implement for testing the part within the rules.

This procedure contains:
  A theoretical definition of the test zone,
  A theoretical definition of defects sought in the test zone,
  A theoretical definition of the test-zone acquisition mode,
  A definition of the validity ranges of the following parameters for the test zone:
  Maximum speed of movement of the probe,
  Orientation of the active surface of the test probe with respect to the surface of the part being inspected,
  Position and orientation of the active surface of the test probe with respect to the original reference frame of the test zone,
  Irregularity of the surface being inspected,
  A set of static rules for the entire acquisition of test data for the zone.

There are two acquisition modes:
Mode consisting of zone coverage and detection of potential defects,
Defect characterisation mode.

The information D2 include a theoretical geometric definition of the part to be tested P. This theoretical geometric definition is necessary for defining the volume to be inspected in order to deduce therefrom the test zone Z. This definition includes the definition of a set of parameters and of points characteristic of the part to be tested. A characteristic point on the part to be tested is a theoretical position on this part.

In the example embodiment selected, the thickness of the sheets, the angles and the width of the bevel are the parameters to be given (FIG. 3) in the information D2. The sought defects defined in the test procedure D1 are the bonding defects along the bevel as well as the inclusions in the volume of the weld.

The definition D3 of the test zone Z produced by the step E11 corresponds to the surface that must be covered by the probe, to the adjustment configurations to be applied to the probe and to the types of defects sought in this zone.

The adjustment configurations represent all the parameters to be applied to the acquisition system in order to obtain the inspection data according to the required conditions and location. In the preferred embodiment, the adjustment parameters for the ultrasound acquisition system are: the gain, the centre frequency, the sampling frequency, the channel delays, the ports, etc.

Naturally, it is possible to define a plurality of test zones on the part P. Step E12 produces data defining the objects that will subsequently be monitored by the position-monitoring sub-system 2, using the test procedure D1. These objects are the first rigid body associated with the probe S and serving for the monitoring of the probe and the pointing device serving for learning characteristic points. The definition data D4 define the first rigid body associated with the probe S and serving for monitoring the probe. The definition data D5 define the pointing device serving for learning characteristic points.

Definition of an object means here the declaration of the object as an object to be monitored by the position-monitoring sub-system 2.

Step E13 is the configuration of the sub-system 3 for acquiring data for characterising the surface of the test zone, using the test procedure D1. This configuration produces configuration data D6.

The configuration of the sub-system 3 for acquiring surface-characterisation data represents all the static adjustments (i.e. those that do not change throughout the acquisition) for the test zone and throughout the duration of the test. It is a case in particular of the ultrasound acquisition frequency, of ultrasound delays, etc.

Step E14 is the configuration of the sub-system 1 for acquiring data for non-destructive testing of the part to be tested, using the test procedure D1r. This configuration produces configuration data D7.

The configuration of the sub-system 1 for acquiring non-destructive test data represents all the static adjustments (i.e. those that do not change throughout the acquisition) for the zone and for the whole test duration. It is a case in particular of the ultrasound acquisition frequency, the gain, etc.

At the end of the main step E1, the test zone Z is defined and the three sub-systems 1, 2 and 3 are configured.

The main step E1 is followed by the main step E2 of calibrating the non-destructive testing of the part to be tested P.

Figure 7:
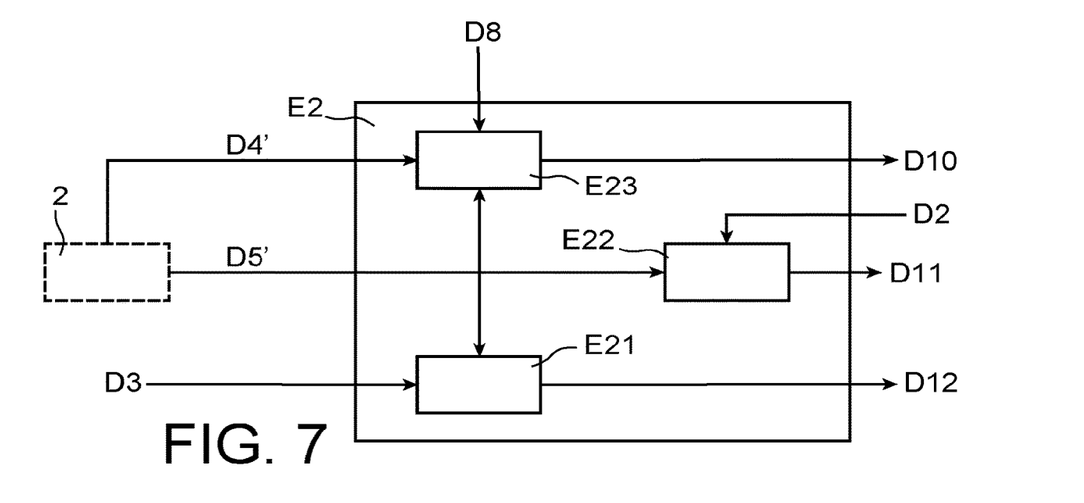
FIG. 7 illustrates steps of calibration of non-destructive testing of the part to be tested, included in the method of FIG. 5.

The main step E2 includes three non-sequential steps E21 to E23 and is detailed in FIG. 7. These steps are based on FR 1 859 569.

Step E21 is a calibration of the test zone as defined in step E2 of FR 1 859 569.

Step E21 produces data D12 on dimensions of the test zone, from the definition data D3 of the test zone Z on the part to be tested, defined by step E11. These dimensions make it possible to define a set of parameters and of characteristic points that define the area of the test zone.

Step E22 is a calibration of the origin and of the axes of the test zone, as described with reference to steps E1 and E2 of FR 1 859 569.

A single origin and a single set of axes are defined for all the test zones and will be referred as "test origin reference frame".

This step produces a passage matrix D11 between the test origin reference frame of the part to be tested and a reference frame of the position-monitoring sub-system 2. This calculation is made from the theoretical geometric definition information D2 on the part to be tested P, the information D2 including a set of parameters and of characteristic points of the part to be tested, and of the position D5' of these points measured by the position monitoring sub-system 2.

Step E23 is a calibration of the origin and of the axes of the zone of the active surface of the probe as defined in step E3 of FR 1 859 569.

This step produces the passage matrix D10 between the reference frame of the probe S and the reference frame of its active surface. This calibration is implemented using firstly a definition D8 of characteristic points of the active surface of the probe S and secondly position data D4' of these points produced by the position monitoring sub-system 2. It should be noted that the position data D4' are supplied continuously by the position-monitoring sub-system 2.

The main step E2 is followed by the main step E3 of detecting potential defects in the test volume of the part to be tested. The main step E3 is implemented while an operator is using the non-destructive testing system described with reference to FIG. 1 for testing the part P. The main step E3 includes three steps E31 to E33 and is detailed in FIG. 8.

Figure 8:
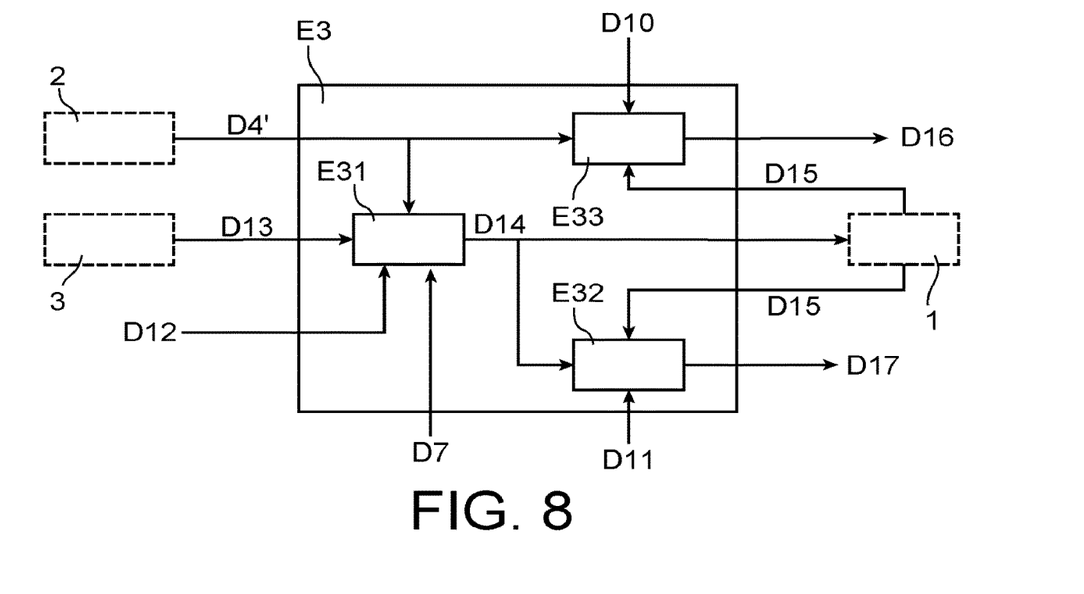
FIG. 8 illustrates steps for detecting defects in the test volume of the part to be tested, included in the method of FIG. 5.

Step E31 is a generation of acquisition-adjustment data D14 that are supplied to the sub-system 1 for acquiring non-destructive test data on of the part to be tested. The acquisition adjustments represent all the parameters used by the test data acquisition sub-system 1 for controlling the probe S that will implement the emission and reception of the signals. The acquisition adjustments D14 contain in particular the path that the probe S must follow over the test zone Z.

During step E31, the position-monitoring sub-system 2 determines the current position of the first rigid body associated with the probe S and produces current position data D4' for the first rigid body associated with the probe S. During step D31, the sub-system 3 for acquiring surface-characterisation data determines surface data D13 of the test zone Z.

To generate the acquisition adjustment data D14, step E31 uses the data D4', the data D13 and the coordinates D12 of the characteristic points of the test zone Z in the reference frame of the position monitoring sub-system 2, produced by step E21.

Step E31 is followed by step E32, which is a detection of potential defects and, when a defect is detected, the determination of the position of the defect detected. A defect is for example a crack or an inclusion in the part. A defect is defined from the signal received by the sub-system 1 for acquiring non-destructive test data and is manifested by a higher or lower signal amplitude than expected according to the position. When a defect is detected, the position of the defect is determined from the expected position of the probe S and the expected ultrasound path, which depend on the acquisition adjustments defined.

This position is defined from acquisition data D15 supplied by the sub-system 1 for non-destructive testing of the part to be tested and the acquisition adjustment data D14 produced by step E31.

When a defect is detected, the result of step E32 is the position D17 of this defect, expressed in the reference frame of the test zone Z by means of the passage matrix D11 produced by step E22.

In parallel to steps E31 and E32, step E33 generates in real time the information necessary for verifying compliance with the test procedure: complete travel over the zone, correct use of the sensor (speed, orientation, contact with the surface, etc.), as disclosed in FR 1 859 569. In this document, the configuration of the device for non-destructive testing of a mechanical part guarantees the validity of a manual test on the mechanical part implemented by an operator.

This is because, during the test proper, the computer then produces the following information:
Position of the active surface of the probe with respect to the reference frame of the test zone,
Orientation of the active surface of the probe with respect to the reference frame of the test zone.

From this information, the computer is capable in particular of:
Determining the speed of movement of the active surface of the probe,
Verifying compliance of the orientation of the probe with respect to the axes of the test zone,
Verifying the accomplishment of the coverage of the test zone, for example in terms of resolution, dimensions and geometry, with respect to a predefined coverage, furthermore using the information on dimensions of the test zone,
Verifying the coupling (height and inclination) between the active surface of the probe and the test zone of the mechanical part.

Step E33 uses the passage matrix D10 between the reference frame of the probe S and the reference frame of its active surface and the position data D4' of the first rigid body associated with the probe S.

Step E33 produces test-zone coverage data D16.

The test-zone coverage data D16 express the portion of the test zone Z on which the test has already been implemented.

When a defect is detected at step E32, the main step E3 is followed by the main step E4 of characterising the detected defect. The main step E4 includes three steps E41 to E43 and is detailed in FIG. 9.

Figure 9:
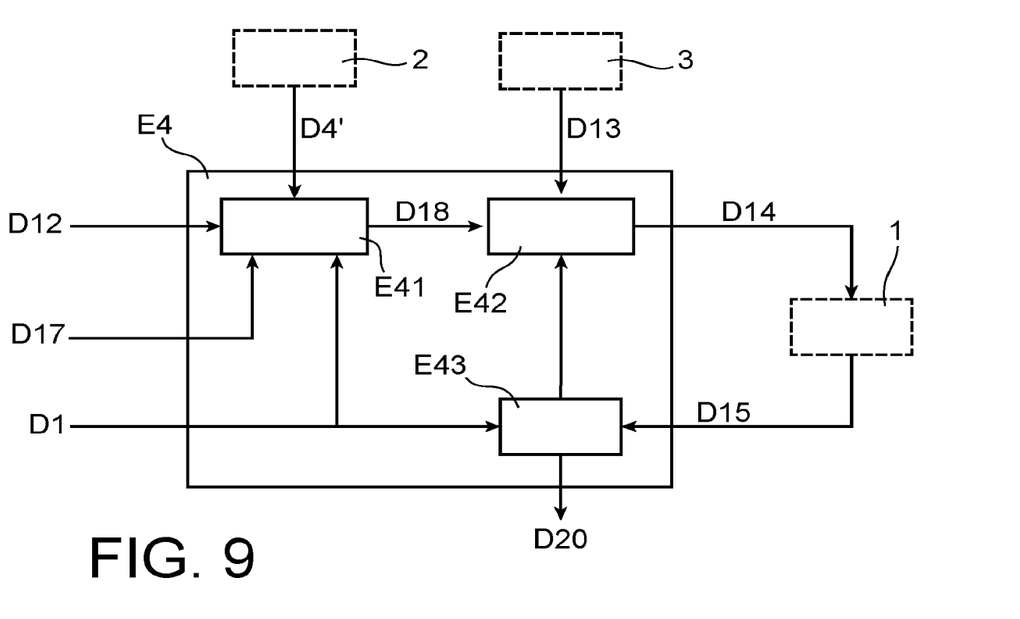
FIG. 9 illustrates defect characterisation steps, included in the method of FIG. 5.

Step E41 is a selection of configuration data D18 of a sequence of non-destructive test data acquisition adjustments around the position of the detected defect. A sequence of adjustments is a succession of acquisition parameters making it possible to sweep the environment of the detected defect with the ultrasound beam and to vary the angle of attack. This makes it possible to specify for example the position of the defect, the extension thereof and the nature thereof.

The configuration of the sequence of adjustments includes the determination of the parameters, fixed by the test procedure for the zone travelled over, necessary for calculating the dynamic adjustments of the test-data acquisition subsystem.

This selection is made according to the defect position data D17 determined at step E32, according to the position data D4' on the first rigid body associated with the probe S produced by the sub-system 2 and according to the coordinates D12 of the characteristic points of the test zone Z in the reference frame of the position-monitoring sub-system 2, produced by step E21.

Step E41 is followed by step E42, which determines a sequence of non-destructive test data acquisition adjustments around the position of the detected defect, from the configuration D18 determined at step E41 and from the surface data D13 of the test zone Z, calculated at step E31 by the sub-system 3 for acquiring surface-characterisation data.

The sequence of data-acquisition adjustments thus determined is supplied to the sub-system 1 for acquiring non-destructive test data with which the operator makes a data acquisition.

The non-destructive test data D15 thus acquired are used at step E43 for characterising the defect (Position, ROI "Region Of Interest", type, dimensions, etc.).

Steps E42 and E43 are run through in a loop until the defect is completely characterised.

The characterisation of the defect is considered to be complete according to the type of test implemented. For example, steps E42 and E43 are run through in a loop over a given number of iterations. According to another example, steps E42 and E43 are run through in a loop as long as a condition is not fulfilled. The condition for stopping the characterisation of the defect is defined in the test procedure D1.

When this condition is met and the characterisation of the defect is considered to be complete, step E43 supplies an instruction to stop step E42 and supplies as an output defect-characterisation data D20 (Position, ROI "Region Of Interest", type, dimensions, etc.).

When the test zone has been completely run over by the probe S (step E3) and the characterisation of any defects detected has ended (step E4), the main steps E3 and E4 are followed by the main step E5 of generating a test report. The main step E5 includes a step E51 and is detailed in FIG. 10.

Figure 10:
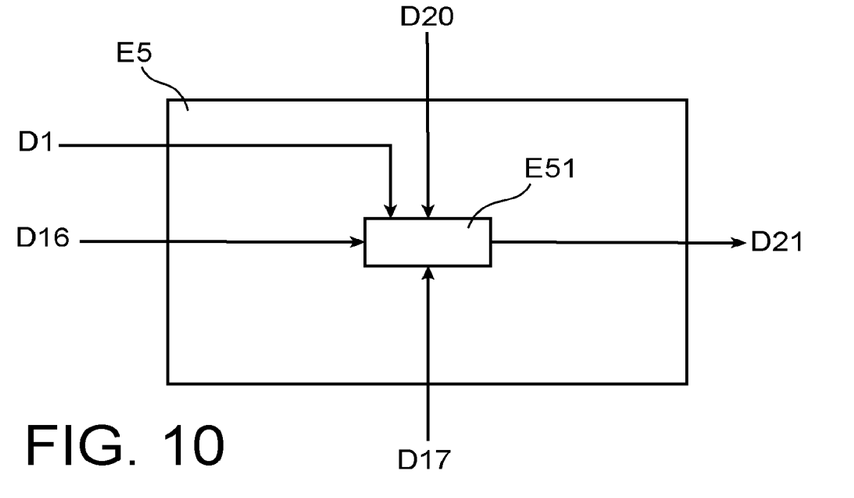
FIG. 10 illustrates a test-report generation step, included in the method of FIG. 5.

Step E51 uses the following data:
the defect-characterisation data D20 determined at step E43,
the procedure data D1,
the test zone coverage data D16 determined at step E33,
the defect position data D17 determined at step E32.

Step E51 produces a test report D21 from these data.

The test report contains at a minimum the identification of the object tested, the contractual requirements for the test, the test configuration, the adjustment parameters, any defects detected and characterisation thereof. The characterisation of a defect includes in particular geometry parameters of the defect, defect properties, with reference to the test procedure D1.

Figure 11:
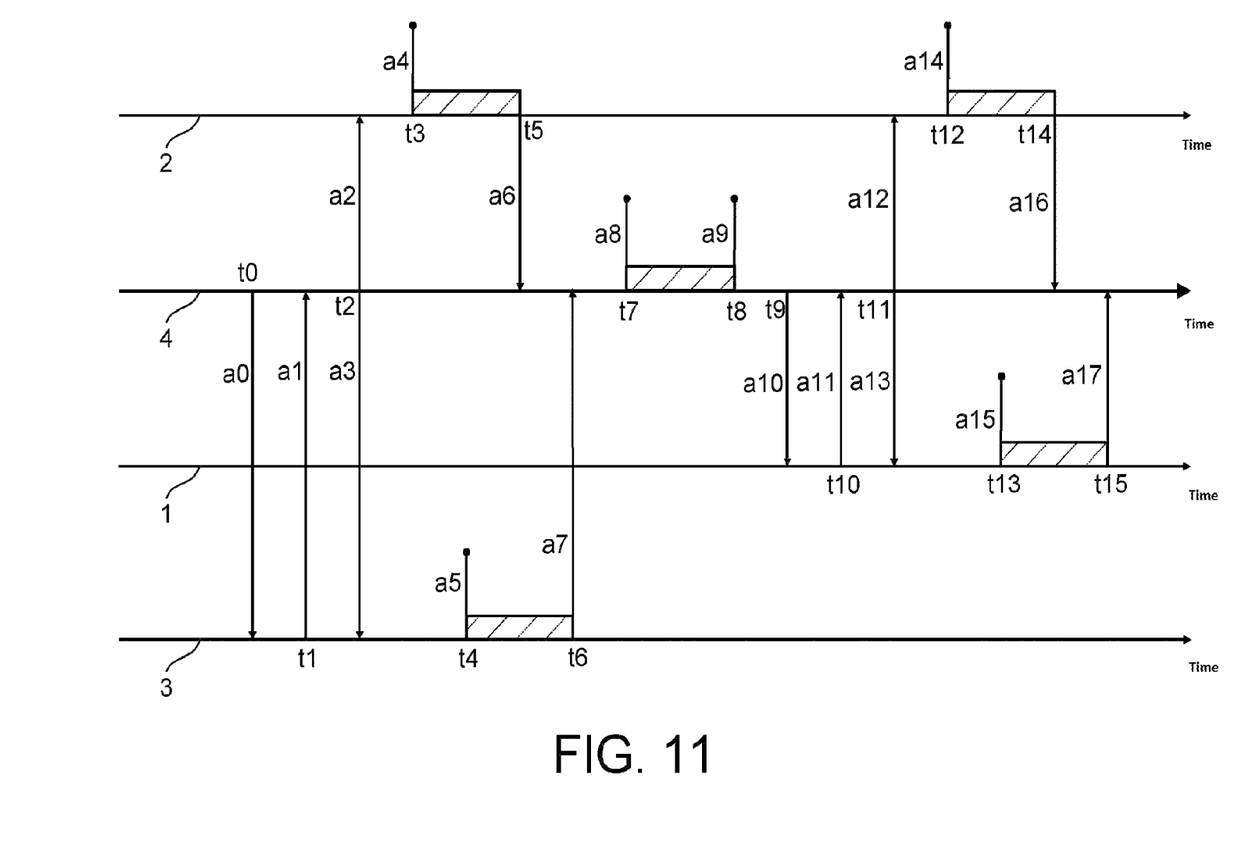
FIG. 11 illustrates a time diagram of the operation of the non-destructive testing system for a part to be tested shown in FIG. 1.

FIG. 11 is a time diagram showing the operation of the system for non-destructive testing of a part to be tested shown in FIG. 1.

More precisely, it is considered here that the main steps E1 of preparing the non-destructive testing of the part to be tested P and E2 of calibration of non-destructive testing of the part to be tested P have been implemented. The operator then uses the non-destructive test system, which implements the main step E3 of detecting potential defects in the test volume of the part to be tested. It is considered that a defect is detected and that the non-destructive test system implements the main step E4 of characterising the detected defect.

In other words, the time diagram of FIG. 11 represents the operation of steps E3 and E4. This time diagram is used for any data acquisition requiring characterisation of the surface of the part.

More precisely, the horizontal axes are respective time axes for the following various sub-systems, from top to bottom:
the sub-system 2 for monitoring the position of the active surface of the non-destructive test probe S,
the central control sub-system 4,
the sub-system 1 for acquiring non-destructive test data for the part to be tested, and
the sub-system 3 for acquiring surface characterisation data.

The central control sub-system 4 centralises the triggering of the acquisitions of the non-destructive test data on the part to be tested and the position data of the probe S.

The time between the triggering and the starting of each acquisition is upwardly limited, which guarantees that the difference between the start of acquisition of test data and the start of acquisition of position data of the probe S is also upwardly limited. Thus the proximity in time between the test data and the position data of the probe for a given acquisition is controlled.

At an instant t0, the central control sub-system 4 sends acquisition configuration data a0 to the sub-system 3 for acquiring surface-characterisation data.

In response, the sub-system 3 for acquiring surface-characterisation data sends at a following instant t1 an acknowledgement a1 of application of the configuration for the surface characterisation to the central control sub-system 4.

At a following instant t2, the central control sub-system 4 simultaneously sends an instruction a2 to trigger the position monitoring to the sub-system 2 and an instruction a3 to trigger the surface-characterisation data acquisition to the sub-system 3, for the surface characterisation.

At a following instant t3, the sub-system 2 makes an acquisition a4 of the position of the active surface of the probe S, for the surface characterisation.

The difference between the instants t3 and t2 is upwardly limited.

At a following instant t4, the sub-system 3 makes an acquisition a5 of data characterising the surface of the test zone.

The difference between the instants t4 and t2 is upwardly limited.

The time between the triggering and the start of each acquisition is upwardly limited, which guarantees that the absolute value of the difference (t4–t3) between the start of acquisition of surface characterisation data and the start of acquisition of position data of the probe S is also upwardly limited. Thus the proximity in time between the surface-characterisation data and the position data of the probe for a given acquisition is controlled. There is therefore synchronisation of the sub-systems 2 and 3.

The absolute value of the difference between the instants t3 and t4 represents the position error for the surface characterisation. This is because, between the instant t3 and the instant t4, the operator continues to move the probe. The fact that the difference in time between t3 and t4 is upwardly limited guarantees that, for a given maximum speed of movement, the probe-position monitoring data and the surface characterisation data are sufficiently close geometrically to each other.

At a following instant t5, the central control sub-system 4 receives the position data a6 of the probe S from the sub-system 2, for the surface characterisation.

At a following instant t6, the central control sub-system 4 receives the data a7 characterising the surface of the test zone from the sub-system 3.

The position data of the probe S and the data characterising the surface of the test zone are paired or coupled. Since the sub-system 4 has simultaneously triggered the sub-systems 2 and 3, it knows that the data received from these two sub-systems after this triggering are the data corresponding to this same triggering and therefore that they can be paired.

The pairing between the data characterising the surface of the test zone and the probe-position data guarantees that each of the surface characterisation data items can be paired with a probe-position data item, and this exactly and below a given precision.

By allocating a triggering number, or index, to each triggering, it is possible to allocate the same number to the surface-characterisation data and to the probe-position data that correspond respectively to each triggering. Thus exactitude is guaranteed, since it is not possible to pair a surface-characterisation data item of index N with a probe-position data item of index M, if M is different from N.

"Below a given precision" means the fact that it is not possible to pair a surface-characterisation data item with a probe-position data item if the difference in time between the two is greater than the given precision.

The central sub-system 4 begins the calculation a8 of the configuration for the acquisition of the control data at the instant t7 and terminates it at the instant t8 (a9). This calculation requires knowledge of the surface characterisation. The configuration for the acquisition of the control data is calculated at the two main steps E3 and E4, in the steps E31 and E42 respectively.

At a following instant t9, the central control sub-system 4 sends acquisition configuration data a10 to the sub-system 1 for acquiring non-destructive test data of the part to be tested, for the purpose of making an acquisition of test data. This test data acquisition can be done both in the zone-coverage and potential-defect detection phase (step E3) and in the defect characterisation phase (step E4).

At a following instant t10, the central control sub-system 4 receives data a11 acknowledging application of the configuration from the sub-system 1 for acquiring non-destructive data on the part to be tested, for the acquisition of control data.

At a following instant t11, the central control sub-system 4 simultaneously sends an instruction a12 to trigger the positioning monitoring to the sub-system 2 and an instruction a13 to trigger the acquisition of test data to the sub-system 1, for the acquisition of test data.

At a following instant t12, the sub-system 2 makes an acquisition a14 of the position of the active surface of the probe S, for the acquisition of test data.

The difference between the instants t12 and t11 is upwardly limited.

At a following instant t13, the sub-system 1 makes an acquisition a15 of test data, for the acquisition of test data.

The difference between the instants t13 and t11 is upwardly limited.

As before, the time between the triggering and the start of each acquisition is upwardly limited, which guarantees that the absolute value of the difference (t13–t12) between the start of acquisition of test data and the start of monitoring the position of the probe S is also upwardly limited. Thus the proximity in time between the test data and the probe position data for a given acquisition is controlled. There is therefore synchronisation of the sub-systems 1 and 2.

The absolute value of the difference between the instants t13 and t12 represents the position error for the acquisition of test data. This is because, between the instant t12 and the instant t13, the operator continues to move the probe. The fact that the difference in time between t12 and t13 is upwardly limited guarantees that, for a given maximum movement speed, the probe position monitoring data and the test data are sufficiently close geometrically to each other.

At a following instant t14, the central control sub-system 4 receives the probe position monitoring data a16 from the sub-system 2, for the acquisition of test data.

At a following instant t15, the central control sub-system 4 receives the test data a17 from the sub-system 1, for the acquisition of test data.

The probe-position data and the test data are paired or coupled. Since the sub-system 4 has simultaneously triggered the sub-systems 1 and 2, it knows that the data received from these two sub-systems after this triggering are the data corresponding to this same triggering and therefore that they can be paired.

The pairing between the test data and the probe-position data guarantees that each of the test data items can be paired with a probe-position data item, and this exactly and below a given precision.

By allocating a trigger number, or index, to each triggering, it is possible to allocate the same number to the test data and to the probe position data that correspond respectively to each triggering. Thus exactitude is guaranteed, since it is not possible to pair a control data item of index N with a probe-position data item of index M, if M is different from N.

"Below a given precision" means the fact that it is not possible to pair a test data item with a probe-position data item if the difference in time between the two is greater than the given precision.

According to the invention, it is possible to verify several items of information, such as in particular the orientation of the probe or the speed of the probe, in order to validate or not the test data acquired at each position of the probe S.

In the example described of the acquisition with meshing of the surface, each test data acquisition is done in two stages:
 Acquisition of data for detecting the surface,
 Acquisition of test data taking account of the surface detected previously.

The verification then consists in ensuring that the positions of the probe S during these two sequential acquisitions are not too far from each other in order to guarantee that the acquisition of test data does indeed take account of the surface detected.

This verification is made, as stated previously, by verifying that:
 the paired probe-position and surface-characterisation data are sufficiently close to each other geometrically speaking. To do this, the high bound of the difference in time between the instants t3 and t4 and the mean speed of the sensor between these instants t3 and t4 are used. The mean speed of the sensor can for example be determined from the positions obtained previously,
 the paired probe-position and test data are sufficiently close to each other geometrically speaking. To do this, the high bound of the difference in time between the instants t12 and t13 and the mean speed of the sensor between these instants t12 and t13 are used. The mean speed of the sensor can for example be determined from the positions obtained previously.

The verification can furthermore be made by verifying that the geometric distance between the positions of the probe at the instants t3 and t12 is not too great. To do this, the positions of the probe measured at the instants t3 and t12 are used.

The invention claimed is:

1. A manual system for non-destructive testing of a part to be tested, comprising:
 a test-data sub-system for acquiring non-destructive test data, including a probe;
 a position-monitoring sub-system for monitoring a position of the probe;
 a surface-characterisation sub-system for acquiring data characterising a surface of a test zone defined on a surface of the part to be tested; and
 a central sub-system,
 wherein the surface-characterisation sub-system is configured to receive as an input parameter data which describes a sought defect on the part to be tested,
 wherein the surface-characterisation sub-system is configured to receive as an input a set of acquired data of the surface of the part inspected by the probe,
 wherein the surface-characterisation sub-system includes a surface-characterisation computer configured to generate sought defect data based on the input parameter data and to determine characteristics of the surface of the part to be tested from the data acquired by the probe which is based on the sought defect data, and
 wherein the central sub-system is for controlling the test-data sub-system, the position-monitoring sub-system, and the surface-characterisation sub-system, according to the test zone travelled over by the probe manipulated by an operator and a predefined operating mode, the central sub-system being configured to synchronise operation of the test-data sub-system, the position-monitoring sub-system, and the surface-characterisation sub-system, and to pair data produced by the test-data sub-system, the position-monitoring sub-system, and the surface-characterisation sub-system during operation thereof.

2. The system for the non-destructive testing of a part to be tested according to claim 1, wherein the central sub-system is configured to simultaneously send a trigger instruction to the position-monitoring sub-system and a trigger instruction to the sub-system for acquiring surface-characterisation data, for the surface characterisation.

3. The system for the non-destructive testing of a part to be tested according to claim 2, wherein the central sub-system is configured to pair position data of the probe and the data for characterising the surface of the test zone that are received in response to the sending of the trigger instruction simultaneously to the position-monitoring sub-system and to the sub-system for acquiring surface-characterisation data.

4. The system for the non-destructive testing of a part to be tested according to claim 1, wherein the central sub-system is configured to simultaneously send a trigger instruction to the position-monitoring sub-system and a trigger instruction to the test-data sub-system, for acquiring test data.

5. The system for the non-destructive testing of a part to be tested according to claim 4, wherein the central sub-system is configured to pair position data of the probe and test data that are received in response to the sending of the simultaneous trigger instruction to the position-monitoring sub-system and to the test-data sub-system.

6. The system for the non-destructive testing of a part to be tested according to claim 1, wherein the test-data sub-system is an ultrasound system including an ultrasound probe.

7. The system for the non-destructive testing of a part to be tested according to claim 1, wherein the position-monitoring sub-system is an optical system.

8. The system for the non-destructive testing of a part to be tested according to claim 1, wherein the sub-system for acquiring surface-characterisation data is configured to produce a set of parameters characteristic of the surface in a form of a surface meshing.

9. A method for non-destructive testing of a part to be tested with a non-destructive testing system, which includes
a test-data sub-system for acquiring non-destructive test data, including a probe;
a position-monitoring sub-system for monitoring a position of the probe;
a surface-characterisation sub-system for acquiring data characterising a surface of a test zone defined on a surface of the part to be tested; and
a central sub-system,
wherein the surface-characterisation sub-system is configured to receive as an input a set of acquired data of the surface of the part inspected by the probe,
wherein the surface-characterisation sub-system includes a surface-characterisation computer configured to determine characteristics of the surface of the part to be tested from the data acquired by the probe, and
wherein the central sub-system is for controlling the test-data sub-system, the position-monitoring sub-system, and the surface-characterisation sub-system, according to the test zone travelled over by the probe manipulated by an operator and a predefined operating mode, the central sub-system being configured to synchronise operation of the test-data sub-system, the position-monitoring sub-system, and the surface-characterisation sub-system, and to pair data produced by the test-data sub-system, the position-monitoring sub-system, and the surface-characterisation sub-system during operation thereof,
the method comprising:
generating sought defect data describing a sought defect on the part to be tested based on parameter data received as an input which defines the part to be tested; and
detecting a potential defect based on the sought defect data and, when the potential defect is detected, characterising the detected defect, the detecting the potential defect and characterising the detected defect including:
simultaneously sending, by the central sub-system, of an instruction to trigger the position monitoring to the position-monitoring sub-system and an instruction to trigger the acquisition of surface-characterisation data to the sub-system for acquiring surface-characterisation data, and
simultaneously sending by the central sub-system of an instruction to trigger the position monitoring to the position-monitoring sub-system for monitoring the position of the probe and an instruction to trigger the acquisition of test data to the test-data sub-system.

10. The method for non-destructive testing according to claim 9, wherein detecting the potential defect includes acquiring data for characterising the surface of the test zone by the sub-system for acquiring surface-characterisation data and using the data characterising the surface of the test zone for determining a position of the defect.

11. A method for non-destructive testing of a part to be tested with a non-destructive testing system, which includes
a test-data sub-system for acquiring non-destructive test data, including a probe;
a position-monitoring sub-system for monitoring a position of the probe;
a surface-characterisation sub-system for acquiring data characterising a surface of a test zone defined on a surface of the part to be tested; and
a central sub-system,
wherein the surface-characterisation sub-system is configured to receive as an input a set of acquired data of the surface of the part inspected by the probe,
wherein the surface-characterisation sub-system includes a surface-characterisation computer configured to determine characteristics of the surface of the part to be tested from the data acquired by the probe, and
wherein the central sub-system is for controlling the test-data sub-system, the position-monitoring sub-system, and the surface-characterisation sub-system, according to the test zone travelled over by the probe manipulated by an operator and a predefined operating mode, the central sub-system being configured to synchronise operation of the test-data sub-system, the position-monitoring sub-system, and the surface-characterisation sub-system, and to pair data produced by the test-data sub-system, the position-monitoring sub-system, and the surface-characterisation sub-system during operation thereof,
the method comprising:
detecting a potential defect and, when the potential defect is detected, characterising the detected defect, the detecting the potential defect and characterising the detected defect including:
simultaneously sending, by the central sub-system, of an instruction to trigger the position monitoring to the position-monitoring sub-system and an instruction to trigger the acquisition of surface-characterisation data to the sub-system for acquiring surface-characterisation data, and
simultaneously sending by the central sub-system of an instruction to trigger the position monitoring to the position-monitoring sub-system for monitoring the position of the probe and an instruction to trigger the acquisition of test data to the test-data sub-system,
wherein detecting the potential defect includes acquiring data for characterising the surface of the test zone by the sub-system for acquiring surface-characterisation data and using the data characterising the surface of the test zone for determining a position of the defect, and
wherein characterising the detected defect includes using data characterising the surface of the test zone to determine a sequence for adjusting acquisition of non-destructive test data around the position of the detected defect.

12. A non-transitory computer-readable medium storing a program comprising instructions for implementing the method according to claim 9 when said program is executed by a computer.

13. A non-transitory computer-readable medium storing a computer program comprising instructions for implementing the method according to claim 10 when said program is executed by a computer.

14. The method for non-destructive testing according to claim 9, further comprising indexing each triggering to allocate the same number to the surface-characterisation data and to position-monitoring data that correspond respectively to each triggering.

* * * * *